United States Patent
Haapalainen

(10) Patent No.: US 10,144,989 B2
(45) Date of Patent: Dec. 4, 2018

(54) RECOVERY OF GOLD FROM SOLUTION

(71) Applicant: OUTOTEC (FINLAND) OY, Espoo (FI)

(72) Inventor: Mika Haapalainen, Pori (FI)

(73) Assignee: OUTOTEC (FINLAND) OY, Espoo (FI)

( * ) Notice: Subject to any disclaimer, the term of this patent is extended or adjusted under 35 U.S.C. 154(b) by 0 days.

(21) Appl. No.: 15/557,885

(22) PCT Filed: Mar. 17, 2016

(86) PCT No.: PCT/FI2016/050161
§ 371 (c)(1),
(2) Date: Sep. 13, 2017

(87) PCT Pub. No.: WO2016/146892
PCT Pub. Date: Sep. 22, 2016

(65) Prior Publication Data
US 2018/0073103 A1 Mar. 15, 2018

(30) Foreign Application Priority Data
Mar. 18, 2015 (FI) .................................... 20155187

(51) Int. Cl.
| | | |
|---|---|---|
| C22B 11/00 | (2006.01) | |
| C22B 3/00 | (2006.01) | |
| C01G 7/00 | (2006.01) | |
| C22B 3/26 | (2006.01) | |
| C22B 3/44 | (2006.01) | |
| C22B 5/00 | (2006.01) | |

(52) U.S. Cl.
CPC ............ *C22B 11/042* (2013.01); *C01G 7/003* (2013.01); *C22B 3/0009* (2013.01); *C22B 3/44* (2013.01); *C22B 5/00* (2013.01); *C22B 11/00* (2013.01); *C22B 11/04* (2013.01)

(58) Field of Classification Search
CPC ...... C22B 11/04–11/048; C22B 3/0009; C22B 3/44; C22B 5/00; C01G 7/003
USPC .......................................................... 423/24
See application file for complete search history.

(56) References Cited

U.S. PATENT DOCUMENTS

| | | | | |
|---|---|---|---|---|
| 3,736,126 A | * | 5/1973 | Fritz ...................... | C01G 7/003 423/25 |
| 3,930,845 A | | 1/1976 | Bovey et al. | |
| 2013/0276284 A1 | * | 10/2013 | Brosseau ................ | C22B 7/007 29/426.1 |
| 2014/0191019 A1 | * | 7/2014 | Chen ........................ | H05K 3/22 228/264 |

FOREIGN PATENT DOCUMENTS

| | | |
|---|---|---|
| GB | 2 349 876 A | 11/2000 |
| WO | 01/83835 A2 | 11/2001 |
| WO | WO 2011/154603 A1 | 12/2011 |
| WO | WO 2012/024603 A2 | 2/2012 |

OTHER PUBLICATIONS

Search Report dated Nov. 17, 2015, by the Finish Patent and Registration Office in corresponding Finish Patent Application No. 20155187 (1 pages).
International Search Report (PCT/ISA/210) dated Jun. 6, 2016, by the European Patent Office as the International Searching Authority for International Application No. PCT/FI2016/050161.
Written Opinion (PCT/ISA/237) dated Jun. 6, 2016, by the European Patent Office as the International Searching Authority for International Application No. PCT/FI2016/050161.
International Preliminary Report on Patentability (PCT/IPEA/409) dated Jun. 12, 2017, by the European Patent Office as the International Preliminary Examining Authority for International Application No. PCT/FI2016/050161.
Scott et al., "MINATAUR: the Mintek alternative technology to gold refining", Journal of the South African Institute of Mining and Metallurgy, Jul. 2004, pp. 339-343, Retrieved from the Internet: URL:http://reference.sabinet.eo.za/webx/access/journal archive/0038223X/2850.pdf.

* cited by examiner

*Primary Examiner* — Steven J Bos
(74) *Attorney, Agent, or Firm* — Buchanan, Ingersoll & Rooney PC

(57) ABSTRACT

A method is disclosed for recovering gold from a gold-containing organic solution containing soluble gold. The method comprises contacting the gold-containing organic solution with an aqueous stripping solution in order to extract gold from the gold-containing organic solution into the aqueous stripping solution. The aqueous stripping solution containing gold is separated from the organic solution. The separated aqueous stripping solution containing gold is contacted with a reducing agent containing sodium metabisulphite, in order to reduce gold from the aqueous stripping solution.

11 Claims, 2 Drawing Sheets

RECOVERY OF GOLD FROM SOLUTION

TECHNICAL FIELD

The exemplary and non-limiting embodiments relate generally to recovering gold, and more particularly to a method for recovering gold from a gold-containing solution.

BACKGROUND ART

A gold solvent extraction process may involve the use of a gold extraction reagent which is an efficient gold extractant having a high separation factor over metal impurities of a feed solution (i.e. pregnant leach solution, PLS). The process involves an organic phase comprised of the gold extraction reagent. The gold extraction reagent extracts gold from acidic chloride solutions where gold appears as a gold chloride complex $H^+AuCl_4^-$. A gold-containing organic phase is obtained by the extraction. Gold extracted into the organic phase is scrubbed by 1.5 M to 8 M HCl to remove impurities and then stripped by an aqueous stripping solution in order to recover gold into an aqueous phase. From the aqueous phase, gold may be recovered by electrolysis or reduced into a solid form by using oxalate acid or sodium borohydride as a reducing agent.

In the process, the costs of HCl used for the scrubbing are high, as at least 3 M HCl, typically 5 M HCl, is used for the scrubbing in order to minimize gold loss and maximize scrubbing result.

SUMMARY

An object is thus to provide a method so as to alleviate the above disadvantages. The objects are achieved by a method which is characterized by what is stated in the independent claims. Preferred embodiments are disclosed in the dependent claims.

In an aspect, a method for recovering gold from a gold-containing organic solution containing soluble gold, comprises contacting the gold-containing organic solution with an aqueous stripping solution, in order to extract gold from the gold-containing organic solution into the aqueous stripping solution; separating the aqueous stripping solution containing gold from the organic solution; and contacting the separated aqueous stripping solution containing gold with a reducing agent containing sodium metabisulphite, in order to reduce gold from the aqueous stripping solution.

BRIEF DESCRIPTION OF THE DRAWINGS

In the following the solution will be described in greater detail by means of preferred embodiments with reference to the attached drawings, in which.

DETAILED DESCRIPTION OF SOME EMBODIMENTS

Figure 1:
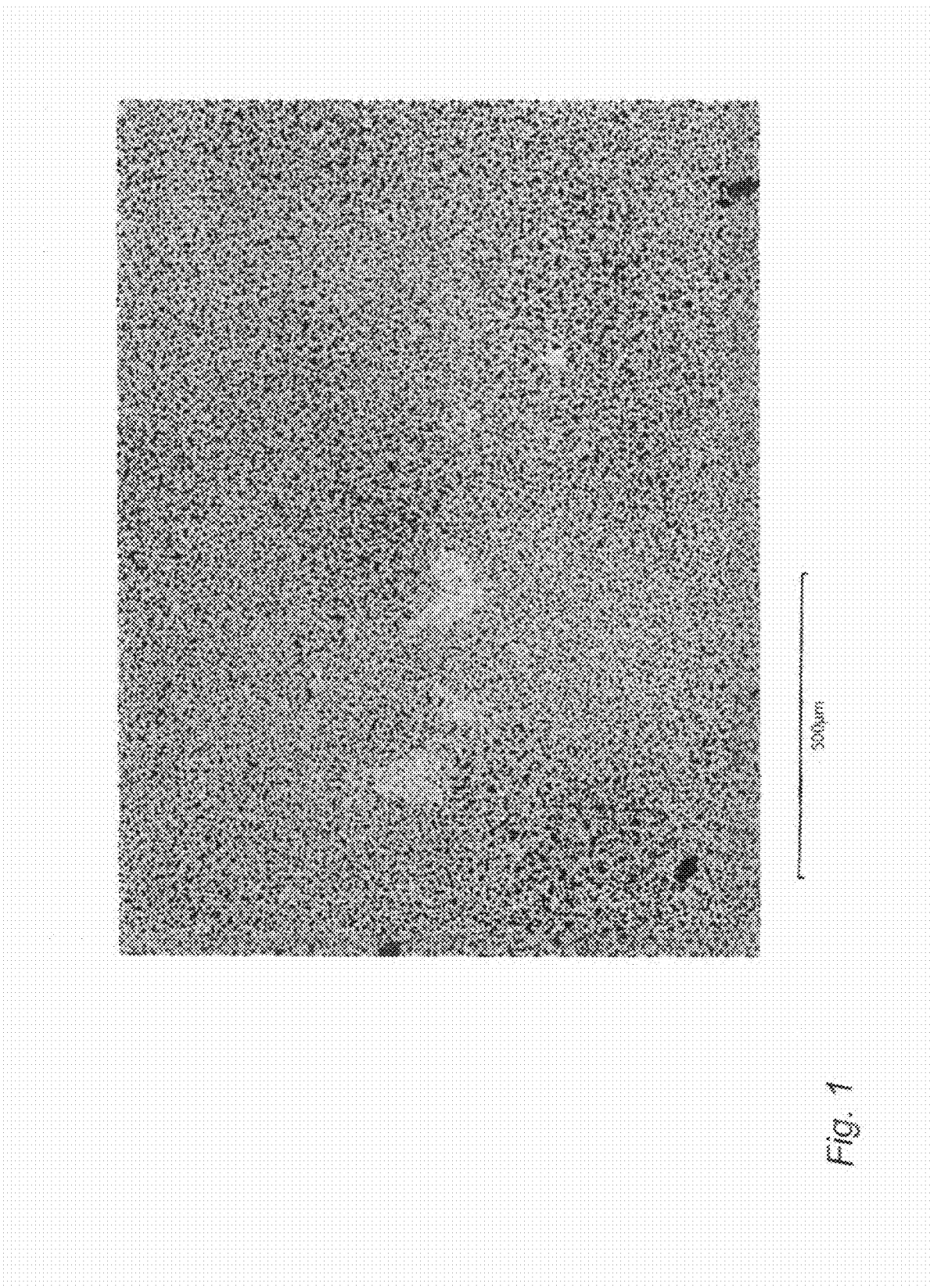
FIG. 1 shows a SEM image of reduced solid gold obtained by a reduction test.

The following embodiments are exemplary. Although the specification may refer to "an", "one", or "some" embodiment(s) in several locations, this does not necessarily mean that each such reference is to the same embodiment(s), or that the feature only applies to a single embodiment. Single features of different embodiments may also be combined to provide other embodiments. Furthermore, words "comprising" and "including" should be understood as not limiting the described embodiments to consist of only those features that have been mentioned and such embodiments may contain also features/structures that have not been specifically mentioned. All words and expressions should be interpreted broadly and they are intended to illustrate, not to restrict, the embodiment.

A gold solvent extraction process may involve a gold extraction reagent containing two components, an organic diester and an organic alcohol (such as a diester of 2,2,4-trialkyl-1,3-pentanediol (e.g. 2,2,4-trimethyl-1,3-pentanediol di-isobutyrate or a derivative of it), and a long-chain alcohol (e.g. 2-ethylhexanol)). The gold extraction reagent may be used to extract gold from acidic chloride solutions where gold appears as a gold chloride complex $H^+AuCl_4^-$. A gold-containing organic phase is obtained by the extraction with the gold extraction reagent. The gold-containing organic phase is scrubbed with hydrochloric acid for removing impurities, wherein some of the acid (i.e. HCl) is co-extracted into the organic phase. Acid co-extracted into the organic phase increases acidity of the organic phase, thus hindering gold stripping efficiency. Acid co-extracted into the organic phase is stripped in a stripping step. The stripped acid is lost during the process.

In an exemplary embodiment, the scrubbing step may be eliminated. Instead, in an exemplary embodiment, gold appearing in the organic phase is directly stripped by an aqueous stripping solution in order to recover gold into an aqueous phase, thus obtaining a gold-containing aqueous solution. For example, a weakly acidic aqueous solution of NaCl may be used as the aqueous stripping solution in the process. The organic and aqueous phases are separated (by phase settling) from each other. From the separated gold-containing aqueous solution, gold is recovered (reduced as solid elementary gold) by using sodium metabisulphite (SMBS, $Na_2S_2O_5$) as a reducing agent. The reduced gold may be collected in solid metallic form by filtration.

By using SMBS as the reducing agent in the process, the gold-containing organic phase does not need to be scrubbed or washed to remove impurities before the stripping by the aqueous stripping solution. By using a proper dosage of SMBS, gold may be efficiently recovered with high purity from the aqueous phase. Impurities remain soluble and exit the process together with the filtrate. The weakly acidic aqueous solution of NaCl causes gold to remain soluble (as the gold chloride complex $H^+AuCl_4^-$) during the stripping step.

It is technically and economically feasible to avoid scrubbing and/or washing of the gold-containing organic phase if gold may be recovered efficiently with high purity from the aqueous stripping solution. This is because in addition to impurities, scrubbing also removes some of the gold present in the gold-containing organic phase. Thus, in case of scrubbing, the solution needs to be recycled back to the process to recover the gold removed from the process.

Hydrochloric acid is an expensive chemical. An exemplary embodiment enables minimizing the utilization of hydrochloric acid.

An exemplary embodiment enables eliminating the scrubbing steps, thus enabling a simplified and lower-cost gold recovery process. It is possible to produce gold with high purity. SMBS dosage may be equal or close to a stoichiometric ratio of SMBS:Au. An efficient and selective low-cost reducing agent may be used. An efficient rejection of impurities may be obtained.

In an embodiment, a molar ratio of sodium metabisulphite to gold is used that is less than the stoichiometric ratio of sodium metabisulphite to gold, in order to reduce part of the gold in a first reducing step. Then fresh reducing agent containing sodium metabisulphite is used in a second reducing step in order to reduce gold remaining in the aqueous stripping solution after the first reducing step. In the second reducing step, the molar ratio of sodium metabisulphite to gold may be greater than the stoichiometric ratio of sodium metabisulphite to gold.

In an embodiment, the aqueous stripping solution contains 100 g/l or less of sodium chloride, preferably 10 g/l.

The process may be carried out in a room temperature, in a temperature close to room temperature, or in a slightly elevated temperature (e.g. 10° C. to 80° C., preferably 10° C. to 50° C., more preferably 20° C.). Atmospheric pressure or a pressure close to it may be used.

The stripping step may be carried out in a mixer-settler unit or in a continuous stirred tank reactor (CSTR). The stripping step may involve a continuous process. The process may involve recycling of components (such as the organic phase (upper phase) after the stripping and/or the aqueous phase (lower phase) after the reducing) back to the stripping step. The phase separation may be carried out e.g. in a mixer-settler unit. In the settler part, organic and aqueous phases are separated and carried away separately. The organic phase may be recycled to the extraction step, and the aqueous solution/stripping solution may be recycled to the stripping step (e.g. to CSTR). From the slurry obtained in the reduction step, solid material (including gold) may be separated e.g. by filtering.

EXAMPLE

Laboratory gold extraction tests were conducted to test the capability of SMBS to reduce gold from the aqueous stripping solution using the above disclosed gold extraction reagent (organic diester+organic alcohol) as the organic phase. A synthetic pregnant leach solution was prepared. Table 1 shows the composition of the pregnant leach solution (PLS).

TABLE 1

| PLS composition | |
| --- | --- |
| Au | 30.1 mg/l |
| Ca | 67 200 mg/l |
| Cu | 77 400 mg/l |
| Fe | 184 mg/l |
| Mg | 559 mg/l |
| Pb | 529 mg/l |
| Zn | 441 mg/l |
| Br | 15 g/l |
| Cl | 214 g/l |
| acid | 10 g/l |

Aqueous PLS (containing gold) and the (organic) gold extraction reagent were shaken together for 15 min in a room temperature by using an organic phase/aqueous phase ratio of 1:4 (to extract gold from the aqueous leach solution to the organic phase). After that, the organic phase was separated from the aqueous leach solution, and the gold content of the loaded organic thus obtained was analysed. The detected gold content of the loaded organic (i.e. the gold content of the gold-containing organic phase) was 96.4 mg/l. The gold-containing organic phase was not scrubbed and/or washed.

Unwashed gold-containing organic phase was stripped with an aqueous stripping solution (salt solution containing 10 g/l of NaCl) twice (first and second stripping). A ratio of 3:1 of organic phase/aqueous stripping solution was used. After stripping, the organic phase was removed. The aqueous gold-containing stripping solutions (obtained from the first and second stripping) were merged. Gold concentration in the gold-containing stripping solution was 259 mg/l (see Table 2). Magnesium and lead were not analysed since they are not extracted by the gold extraction reagent and thus do not enter the aqueous stripping solution.

TABLE 2

| Aqueous stripping solution composition after stripping | |
| --- | --- |
| Au | 259 mg/l |
| Ca | 40 mg/l |
| Cu | 320 mg/l |
| Fe | 44 mg/l |
| Mg | NA |
| Pb | NA |
| Zn | 9.5 mg/l |

The gold-containing stripping solution was split into two equal parts for reduction tests. A first reduction test was conducted with a stoichiometric amount of SMBS (i.e. 1.5 mol of SMBS:1 mol Au). A second reduction test was conducted with a 50% overdose of SMBS (2.25 mol of SMBS:1 mol of Au). An 0.5 M SMBS solution was used. The solutions of both of the reduction tests were shaken for 15 min. After shaking, the solutions were filtrated by using a Whatman filter paper with a pore size of 0.22 μm, and then analysis samples ("15 min") were taken from both of the filtrates. Both filtrates obtained by the filtration were left to settle overnight. Then the solutions were filtrated again (Whatman 0.22 μm), and analysis samples ("overnight") were taken from both of the "overnight" filtrates. Compositions of the solutions (i.e. filtrates) are shown in Table 3.

TABLE 3

| Test 1 and test 2 compositions | | | | | |
| --- | --- | --- | --- | --- | --- |
| | | test 1 15 min | test 2 15 min | test 1 overnight | test 2 overnight |
| Au | mg/l | 3 | <1 | <0.01 | 0.01 |
| Ca | mg/l | 38 | 54 | 38 | 53 |
| Cu | mg/l | 307 | 309 | 313 | 307 |
| Fe | mg/l | 43 | 43 | 43 | 43 |
| Mg | NA | NA | NA | NA | NA |
| Pb | NA | NA | NA | NA | NA |
| Zn | mg/l | 9.4 | 9.5 | 9.4 | 9.4 |

As seen from Table 3, soluble gold disappeared from both of the solutions with overnight contact time. The concentrations of the impurities (Ca, Cu, Fe, Zn) were close to their initial values.

With the 15 min contact time, the concentration of soluble gold decreased by 98.8% in test 1, and presumably in test 2 the concentration of soluble gold decreased almost by 100%.

Thus it was detected that even a stoichiometric amount of SMBS vs. soluble gold (259 mg/l) in aqueous stripping solution of Au-SX almost completely (98.8%) reduced gold into solid state within a short contact time (15 min). After a longer contact time (overnight), gold concentration in the stripping solution was below the detection limit (less than 0.01 mg/l) of an ICP-MS (inductively coupled plasma mass spectrometry) analysis apparatus. Based on a SEM (scanning electron microscope) analysis, the produced solid gold contained no impurities (see also FIG. 1). The gold-containing organic phase was not scrubbed before the stripping and reducing steps.

FIG. 1 shows a SEM image of reduced solid gold obtained by test 1 with the 15 min contact time. Reduced solid gold can be seen in the image.

Figure 2:
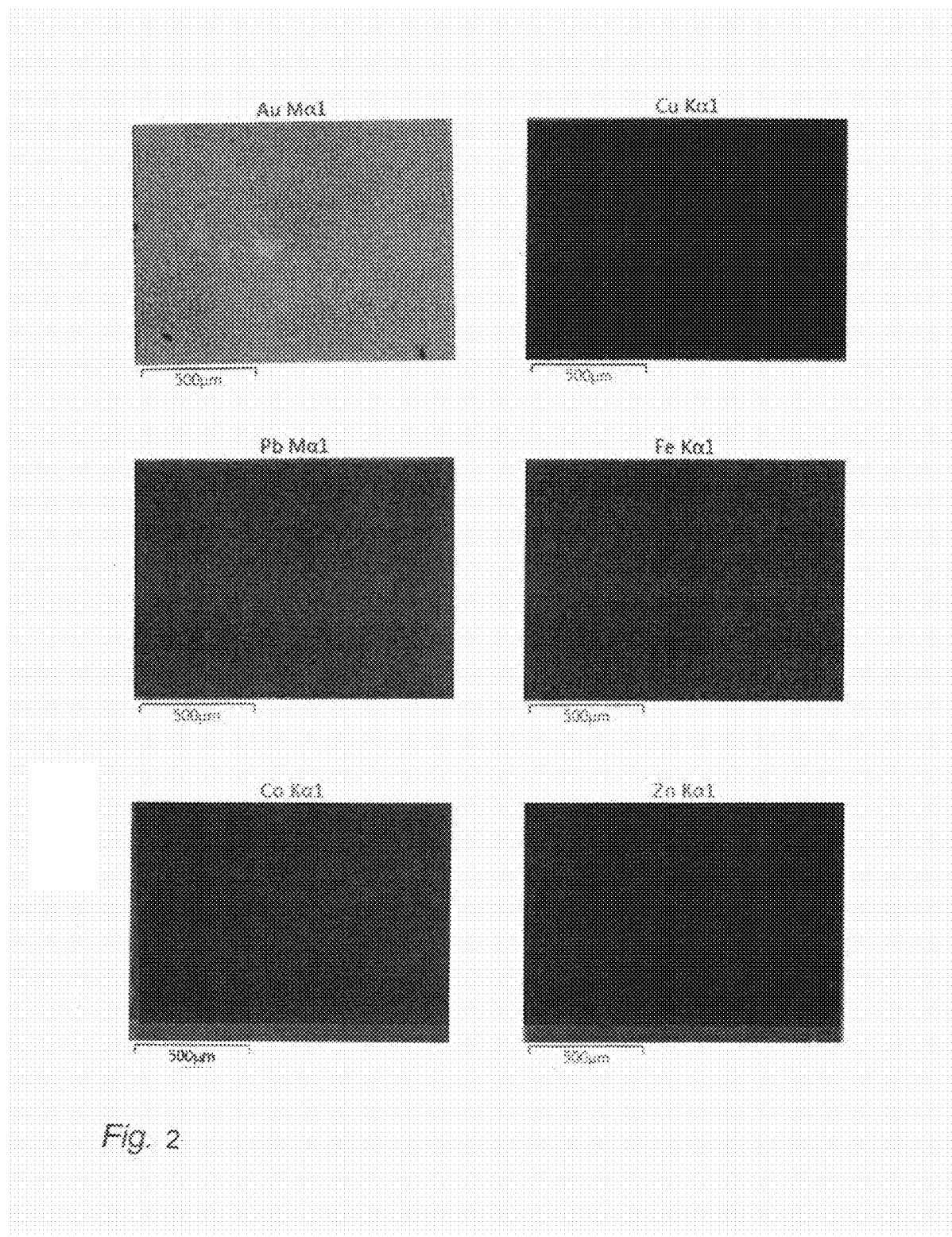
FIG. 2 shows SEM images of solids obtained by the reduction test.

FIG. 2 shows SEM images of solids obtained by test 1 with the 15 min contact time. Reduced solid gold is seen in image a) (glowing image). No impurities (Cu, Pb, Fe, Co, Zn) is seen in images b), c), d), e), f) (dark images); thus implying that impurities were not present in the samples (i.e. they were not reduced by the reducing agent).

It will be obvious to a person skilled in the art that, as the technology advances, the inventive concept can be implemented in various ways. The invention and its embodiments are not limited to the examples described above but may vary within the scope of the claims.

The invention claimed is:

1. A method for recovering gold from a gold-containing organic solution containing soluble gold, wherein the method comprises
    contacting a pregnant leach solution containing gold with a gold extraction reagent containing organic diester and organic alcohol to obtain the gold-containing organic solution;
    contacting the gold-containing organic solution with an aqueous stripping solution to extract gold from the gold-containing organic solution into the aqueous stripping solution;
    separating the aqueous stripping solution containing gold from the organic solution;
    contacting the separated aqueous stripping solution containing gold with a reducing agent containing sodium metabisulphite to reduce gold from the aqueous stripping solution;
    wherein the aqueous stripping solution contains sodium chloride, and wherein the aqueous stripping solution is weakly acidic so that the gold remains soluble in the aqueous stripping solution.

2. A method according to claim 1, wherein the method comprises recovering reduced solid gold from the aqueous stripping solution by filtering the aqueous stripping solution.

3. A method as claimed in claim 1, wherein the method comprises reducing gold from the aqueous stripping solution containing gold without scrubbing the gold-containing organic solution.

4. A method as claimed in claim 1, wherein the method comprises stripping the gold-containing organic solution without scrubbing the gold-containing organic solution.

5. A method as claimed in claim 1, wherein
    the organic diester comprises a diester of 2,2,4-trialkyl-1,3-pentanediol, and/or the organic alcohol comprises 2-ethylhexanol.

6. A method as claimed claim 1, wherein the pregnant leach solution is an acidic chloride solution where gold is a gold chloride complex $H^+AuCl_4^-$.

7. A method as claimed in claim 1, wherein the method comprises
    using a molar ratio of sodium metabisulphite to gold for reducing part of the gold in a first reducing step;
    using in a second reducing step fresh reducing agent containing sodium metabisulphite, in order to reduce gold remaining in the aqueous stripping solution after the first reducing step.

8. A method as claimed in claim 1, wherein the method comprises using a ratio of sodium metabisulphite to gold, for reducing all of the gold.

9. A method as claimed in claim 1, wherein the method comprises performing stripping of the gold-containing organic solution in a continuous stirred tank reactor.

10. A method as claimed in claim 1, wherein the aqueous stripping solution contains 100 g/l or less of sodium chloride.

11. A method as claimed in claim 1, wherein the aqueous stripping solution contains 10 g/l of sodium chloride.

* * * * *